Aug. 24, 1937.  R. D. FISHER  2,090,834
FISHING TOOL
Filed June 2, 1936
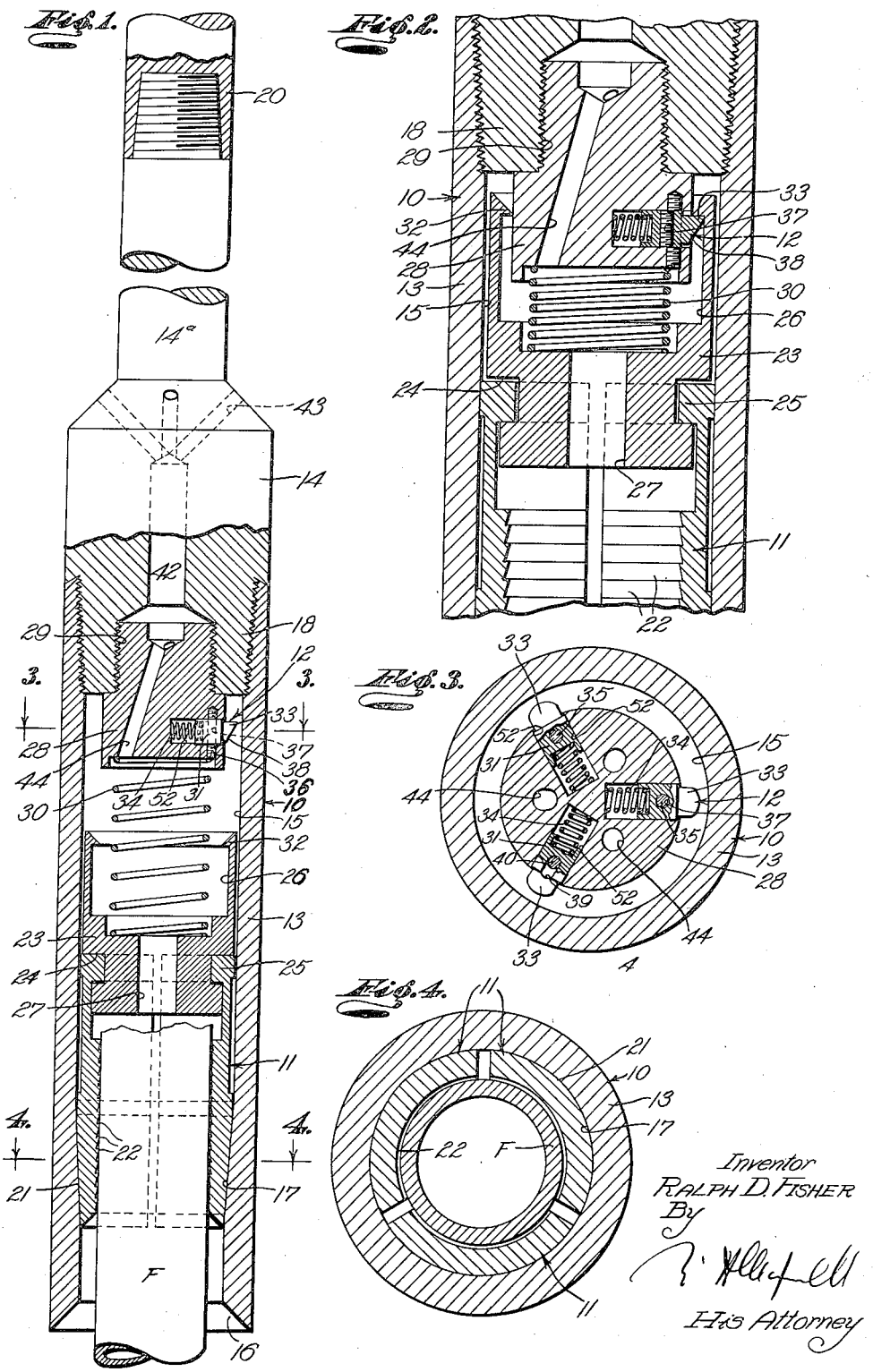
Inventor
RALPH D. FISHER
By
His Attorney Patented Aug. 24, 1937

2,090,834

UNITED STATES PATENT OFFICE 2,090,834

FISHING TOOL

Ralph D. Fisher, Long Beach, Calif., assignor to Baash-Ross Tool Company, Los Angeles, Calif., a corporation of California Application June 2, 1936, Serial No. 83,062

8 Claims. (Cl. 294—102)

This invention relates to a well tool and relates more particularly to a fishing tool for recovering lost objects from a well. A general object of this invention is to provide a practical effective fishing tool of the socket type.

Another object of this invention is to provide a fishing tool or socket for recovering lost objects from a well that may be easily released from an object in the well in the event that the object is caught and cannot be pulled free.

Another object of this invention is to provide an improved releasable socket of the character mentioned adapted for use on line or cable.

Another object of this invention is to provide a releasable socket that is adapted to obtain a firm dependable gripping engagement with a fish for the purpose of withdrawing the same from the well, which engagement may be readily released to free the tool and the cable from the fish in the event that the fish cannot be freed or pulled from the well.

Another object of this invention is to provide a releasable socket that embodies a novel latch means for latching the gripping slips to the body to free them from the fish if it becomes necessary or desirable to release the tool from the fish.

It is a further object of this invention to provide a releasable socket of the character mentioned that is simple and inexpensive and that embodies a minimum number of parts.

The various objects and features of my invention will be fully understood from the following detailed description of a typical preferred form and application of the invention, throughout which description reference is made to the accompanying drawing, in which:

Fig. 1 is a side elevation of the improved socket provided by this invention showing the principal parts in central vertical cross section and showing the slips in gripping engagement with a fish. Fig. 2 is an enlarged fragmentary vertical detailed sectional view of the principal parts of the tool showing the slips in the released or latch position, and Figs. 3 and 4 are enlarged transverse detailed sectional views taken as indicated by lines 3—3 and 4—4, respectively, on Fig. 1.

The releasable socket provided by the present invention includes, generally, a body 10 adapted to move downwardly over a fish F, gripping slips 11 in the body for gripping the fish F and latch means 12 for effecting the release of the slips 11 from the fish F in the event the fish is immovably caught in the well.

The body 10 is an elongate structure adapted to be passed through a well bore. The invention as disclosed in the drawing is in the nature of a cable tool intended for use in the lower end of a line or cable (not shown). The body 10 of the tool illustrated in the drawing includes a tubular lower section 13 and an adapter section or upper section 14 adapted to be connected with the line or cable. The tubular section 13 has its longitudinal opening 15 open at its lower end to receive the fish F. The lower end 16 of the body section 13 is preferably bevelled upwardly and inwardly to guide the tool downwardly over the fish F. A downwardly and inwardly inclined surface 17 is provided on the interior of the section 13 adjacent its lower end to actuate the slips 11. The body section 13 is preferably of substantial length to house the slips 11 and the latch means 12 and to receive a substantial portion of the object or fish F to be recovered. The upper body section 14 is suitably connected with the upper end of the section 13. In the structure illustrated in the drawing a pin 18 is provided on the lower end of the section 14 and is threaded in the upper end of the section 13 to connect the two body sections. The upper body section 14 may be graduated in diameter to have a reduced upper portion 14a. The section 14 is of sufficient length to be of substantial weight whereby it may effect the proper operation of the latch means 12, as will be hereafter described. A rope socket 20, or the like, may be provided on the upper end of the portion 14a to facilitate the connection of the body 10 with the line or cable.

The slips 11 are provided in the lower body section 13 and are adapted to be actuated into gripping cooperation with the fish F by the surface 17. The slips 11 may be varied in character without departing from the broader aspects of the invention. In the particular case illustrated in the drawing there are three like arcuate slips 11 related to form a substantially tubular split assembly. Inclined outer surfaces 21 are provided on the slips 11 to cooperate with the inclined body surface 17. Series of wickers or teeth 22 are provided on the inner sides of the slips 11 to grip the object or fish F. The body 10 and the slips 11 are related for relative longitudinal movement and a carrier 23 shiftably connects the several slips 11 for simultaneous longitudinal movement. The carrier 23 is freely shiftable in the opening 15 of the body. An external annular groove 24 is provided in the lower portion of the carrier 23 and receives inwardly projecting ridges or projections 25 on the upper ends of the slips 11. The cooperation of the projections 25 with the groove 24 connects the slips 11 with the carrier 23. The projections 25 have sufficient clearance in the groove 24 to permit the proper shifting and operation of the slips 11. The portion of the carrier 23 below the groove 24 is reduced in diameter to extend into the upper end of the series of slips 11. A comparatively large socket 26 is provided in the upper end of the carrier 23. An opening 27 may extend longitudinally through the carrier 23 from the socket 26 to the lower end of the carrier to provide for the passage of fluid through the tool.

Spring means is provided to urge the assembly of the slips 11 and the carrier 23 downwardly to assist the slips in obtaining gripping cooperation with the fish F. A plug-like member 28 is threaded in a socket 29 in the pin 18 and a spring 30 is arranged under compression between the member 28 and the bottom of the socket 26 to urge the assembly of the slips 11 and the carrier 23 downwardly. The ends of the spring 30 may be suitably recessed in the member 28 and the bottom wall of the socket 26. When the tool is moved downwardly in the well the upper portion of the fish F may be received in the opening 15 and the slips 11 may pass downwardly around the fish. During such downward movement of the tool the engagement of the fish F with the slips 11 may hold the slips against downward movement so that the surface 17 is freed from the slips. The tool may then be pulled upwardly so that the surface 17 cooperates with the surfaces 21 to actuate the slips into gripping cooperation with the fish F.

The latch means 12 is provided to effect the release of the slips 11 from the fish F in the event that the fish F cannot be freed or withdrawn from the well by a safe up strain on the cable or line. The latch means 12 includes a plurality of latch plungers or latches 31 carried by the body 10 and an annular lip or flange 32 on the carrier 23 for cooperating with the latches 31. In the particular construction illustrated in the drawing the latches 31 are mounted on the member 28 and the flange 32 occurs at the upper end of the socket 26. A plurality of radial openings 52 is provided in the projecting portion of the member 28 and the latches 31 are shiftable longitudinally or radially in the openings 52. In the typical form of the invention illustrated there are three equally spaced radial openings 52 each carrying a shiftable latch 31. The latches 31 have reduced portions or noses 33 adapted to project outwardly from the member 28. The latches 31 are slidable in the openings 52 and springs 34 are arranged under compression between the inner sides of the latches and the bottoms of the openings to urge the latches outwardly.

The invention provides releasable or frangible means for normally preventing inward movement or retraction of certain of the latches 31. One or more of the latches 31 are held against inward movement or retraction by shear pins 35. The shear pins 35 may be threaded upwardly through openings 36 in the member 28 to pass through transverse or vertical openings 37 in the latches 31. In practice the openings 36 may intersect the openings 52 to have portions above the openings 52 and the shear pins 35 may be threaded upwardly through the openings 37 as well as the openings 36. The openings 36 and 37 are related so that the shear pins 35 carried thereby hold the latches 31 in positions where their noses 33 project from the member 28, as illustrated in Figs. 1 and 3 of the drawing. The noses 33 of the latches 31 have downwardly and inwardly inclined surfaces 38 and the upper surface of the flange 32 is inclined downwardly and inwardly. The surfaces 38 of the latches 31 are engageable by the inclined face of the flange 32 when the body 10 is suddenly or forcibly moved downwardly and this engagement forces or tends to force the latches 31 inwardly. The shear pins 35 are designed to break or fail under a known force being designed to break when the body 10 is moved downwardly or allowed to move downwardly suddenly and with substantial force to bring the latch surfaces 38 against the flange 32.

In the particular form of the invention illustrated in the drawing two latches 31 are held against retraction by shear pins 35 and the third latch is free to retract through cooperation with the flange 32. This third latch has a longitudinal slot 39 shiftably passing a stop pin 40 extending vertically through the opening 52 carrying that latch. The pin 40 is engageable by the ends of the slot 39 to limit the movement of the free latch 31. In the event that the two other latches 31 stick or fail to return under the action of the springs 34, after breaking of the pins 35, the third or free latch 31 may be shifted outwardly by its spring 34 to engage under the flange 32 for the purpose of latching the carrier 23 to the body 10.

In the preferred construction a port system is provided in the body 10 to permit the passage or circulation of fluid through the tool and the fish F to prevent the tool from being mudded up. A longitudinal opening 42 extends upwardly through the body section 14 from the socket 29 and ports 43 continue upwardly from the opening 42 to put it into communication with the well bore. A plurality of ports 44 is provided in the member 28. The ports 44 have communication with the opening 42 through the medium of the socket 29 and their lower ends are open to the body opening 15. The port system just described places the interior of the body 10 in communication with the well bore.

In operation the tool is secured to the lower end of a line or cable and is run into the well to the lost object or fish F. The lower end of the body 10 is adapted to be passed downwardly over the upper portion of the fish F so that the series of slips 11 receives the fish. In practice the engagement of the slips 11 with the fish F may free them from the surface 17 for proper engagement about the fish F. An up strain may then be placed on the tool to cause the surface 17 to cooperate with the surface 21 and force the slips 11 inwardly into tight gripping engagement with the fish F. The line or cable may then be pulled upwardly to withdraw the tool and the fish F from the well. The slips 11 gripping the fish F are adapted to transmit the upward strain to the fish to pull or free the fish from the well. In the event, however, that the fish F is immovably caught in the well and cannot be pulled free it becomes desirable to release the socket from the fish to permit the recovery of the socket and the line from the well. To effect the release of the slips 11 from the fish F the body 10 is allowed to suddenly or forcibly move downwardly. The upper body section 14 may be of substantial weight to give the body substantial momentum when allowed to drop. When the body 10 is moved downwardly or is allowed to move downwardly in this manner the surfaces 38 of the latches 31 come into engagement with the inclined surface of the flange 32. This engagement forces the latches 31 inwardly in the openings 52. The latches 31 are moved inwardly with such force that the shear pins 35 are broken so that the latches 31 pass below the flange 32.

As above described, the springs 34 urge the latches 31 outwardly and after the passage of the latches through the flange 32, move the latches outwardly so that their noses 33 may engage under the flange 32. Even though the broken shear pins or fragments thereof may prevent the return or outward movement of two of the latches 31 the third latch 31 is free to move outwardly and engage under the flange 32. When the latches 31 or the free latch 31 have engaged under the flange 32 the line or cable may be raised to withdraw the tool from the well. The latches 31 engaging under the flange 32 connect the carrier 23 and the slips 11 with the body 10 for upward movement therewith. During the above described downward movement of the body 10 the surface 17 moves downwardly from the slips 11 breaking the gripping engagement of the slips with the fish F. Accordingly, when the carrier 23 and the slips 11 are connected with the body 10 by the latches 31 the slips move upwardly with the body and are not actuated the second time by the surface 17. Thus the socket is freed from the fish F when the latches 31 are latched under the flange 32. The fishing tool or socket of the present invention is adapted to obtain a firm dependable gripping engagement with a fish or lost object in a well and is capable of being freed or released from the object or fish in the event that the fish cannot be recovered or pulled free by a safe up strain on the line or cable.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A fishing tool including, a body adapted to be passed downwardly over an object in a well, a reduced downwardly projecting member on the interior of the body, an inclined surface in the body, a shiftable carrier in the body, a tubular extension on the upper end of the carrier adapted to receive said member, slips carried by the carrier and operable into gripping engagement with the object by said surface upon upward movement of the body, and means for latching the carrier to the body upon a subsequent downward movement of the body to hold the slips released from the object, said means including circumferentially spaced latches on said member, and an internal part on the extension cooperable with the latches.

2. A fishing tool including, a body adapted to be passed downwardly over an object in a well, a reduced downwardly projecting member on the interior of the body movable therewith, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including a tubular extension on the upper end of the carrier adapted to receive the said member, a latch carried by the said member to project outwardly therefrom, and a part on the interior of the extension cooperable with the latch.

3. A fishing tool including, a body adapted to be passed downwardly over an object in a well, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including, a plurality of retractible spring urged latches carried by the body, a part on the carrier cooperable with the latches to retract the same and to be restrained by the latches upon their return, and frangible means resisting retraction of at least one of the latches.

4. A fishing tool including, a body adapted to be passed downwardly over an object in a well, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including, a downwardly projecting member on the interior of the member, a retractible spring urged latch carried by the member and projecting outwardly therefrom, and an extension on the upper end of the carrier adapted to receive said member and having an internal part cooperable with the latch to retract the same during the downward movement of the body and held by the latch upon its return.

5. A fishing tool including, a body adapted to be passed downwardly over an object in a well, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including, a retractible spring urged latch carried by the body, a part on the carrier cooperable with the latch to retract the same during the downward movement of the body and held by the latch upon its return, and frangible means resisting retraction of the latch.

6. A fishing tool including, a body adapted to be passed downwardly over an object in a well, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including, a retractible spring urged latch carried by the body, a part on the carrier cooperable with the latch to retract the same during the downward movement of the body and held by the latch upon its return, and a shear pin resisting retraction of the latch.

7. A fishing tool including, a body adapted to be passed downwardly over an object in a well, an inclined surface in the body, a shiftable carrier in the body, slips carried by the carrier and operable into gripping engagement with the object by said surface upon upward movement of the body, and means for latching the carrier to the body upon a subsequent downward movement of the body to hold the slips released from the object, said means including, a plurality of retractible spring urged latches on the body, a latch flange on the carrier cooperable with the latches to retract the same during the downward movement of the body, and frangible means resisting retraction of at least one of the latches.

8. A releasable socket comprising, a body having an opening in its lower end whereby it may move downwardly over an object in a well, an inclined surface on the wall of the opening, a shiftable carrier in the opening, slips movable with the carrier and actuated into gripping engagement with the object by said surface when the body is moved upwardly, and means actuated by a subsequent downward movement of the body for connecting the carrier with the body in a position where the slips are released from the object, said means including a beveled latch part on the carrier, spring urged latches on the body adapted to be retracted by the latch part and thereafter latch under the same, at least one of the latches being free to retract, and frangible means resisting retraction of at least one latch.

RALPH D. FISHER.